J. Whitehead, Wringer Roller.

118313        Patented Aug 22 1871

*Fig. 2.*      *Fig. 3.*

Witnesses:
C. Raettig
Alex F. Roberts

Inventor:
J. Whitehead
Per Munn &c
Attorneys.

UNITED STATES PATENT OFFICE.

JOSEPH WHITEHEAD, OF TRENTON, NEW JERSEY.

IMPROVEMENT IN WRINGER-ROLLERS.

Specification forming part of Letters Patent No. 118,313, dated August 22, 1871.

*To all whom it may concern:*

Be it known that I, JOSEPH WHITEHEAD, of Trenton, in the county of Mercer and State of New Jersey, have invented a new and Improved Wringer-Roller; and I do hereby declare that the following is a full, clear, and exact description thereof, which will enable others skilled in the art to make and use the same, reference being had to the accompanying drawing forming part of this specification.

This invention relates to improvements in wringer-rollers; and it consists in a novel mode of combining the rubber with the shaft by means of plates connected with the flanges or disks and arranged parallel with the shaft, preferably two in number, and arranged on opposite sides, all as hereinafter described.

Figure 1:
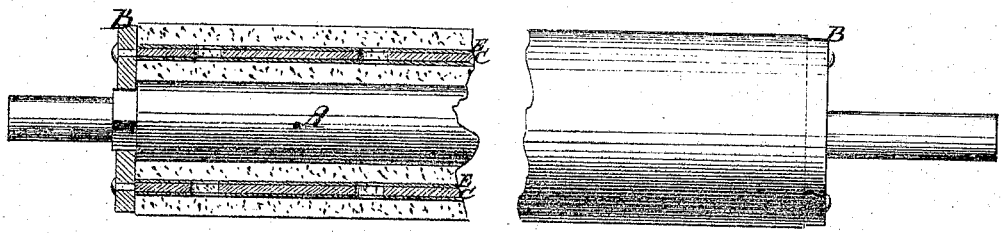
Figure 1:
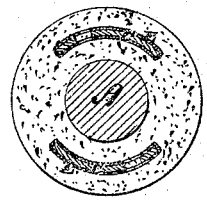
Figure 1:
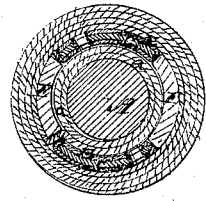

Figure 1 represents my improved roller complete, partly in side elevation and partly in horizontal section. Fig. 2 is a transverse section, of Fig. 1; and Fig. 3 is a transverse section, showing the appearance after the India rubber has been applied and before being vulcanized.

A is the shaft, which is of the ordinary kind; B, metal washers keyed upon the shaft or otherwise secured to it, as far apart as the length the India-rubber part is to be. C represents transversely-curved plates of metal, which I propose to support parallel with the shaft a short distance from it, and preferably on two opposite sides, by means of these flanges, which may have slots suited to receive the ends of the plates or holes for tenons thereon. The said plates also have holes G through them.

The said plates are intended to have the India rubber so built around them as to prevent the possibility of its turning, shifting, or working loose on the shaft. This I propose to accomplish by first winding the India rubber, it being suitably arranged in a sheet, *a*, on the shaft as thick as the distance of the plates from said shaft. Then I lay the plates on the rubber, said plates being inclosed in a canvas cover, E, coated with India rubber, or otherwise arranged to cause the India rubber to adhere to them when vulcanized. Then I apply the disks and secure them both to the shaft and the plates, and fill out the spaces between the plates flush with the outer surfaces by pieces F of India rubber laid in, and then wind on the sheet until the full size is attained; after which I heat it in the ordinary way of causing the layers of India rubber to unite in a mass, and thereby incorporate the plates so that the India rubber cannot turn or shift.

Having thus described my invention, I claim as new and desire to secure by Letters Patent—

The improved wringer-roller, comprising the shaft, disks, plates, the India-rubber sheet *a*, and the strips F, all combined and arranged substantially as specified, the said plates being covered with canvas coated with India rubber, as described.

JOSEPH WHITEHEAD.

Witnesses:
WM. S. MIDDLETON,
EDMUND WHITE.